May 16, 1950     A. H. OELKERS     2,508,336
BRAKE

Filed May 1, 1946                       3 Sheets-Sheet 1

INVENTOR.
Alfred H. Oelkers
BY
Orin B. Garner
Atty.

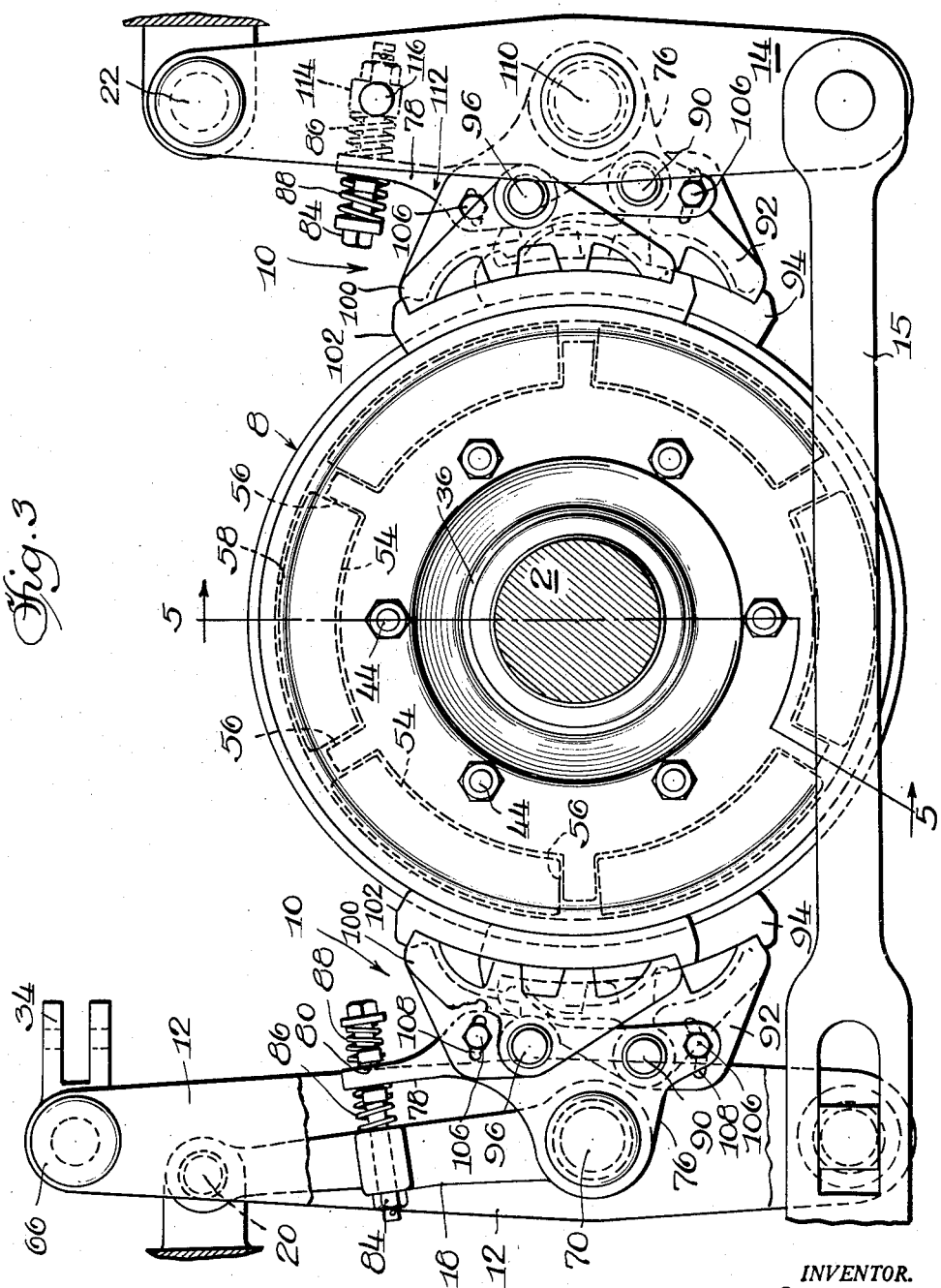

May 16, 1950      A. H. OELKERS      2,508,336
BRAKE
Filed May 1, 1946      3 Sheets-Sheet 3
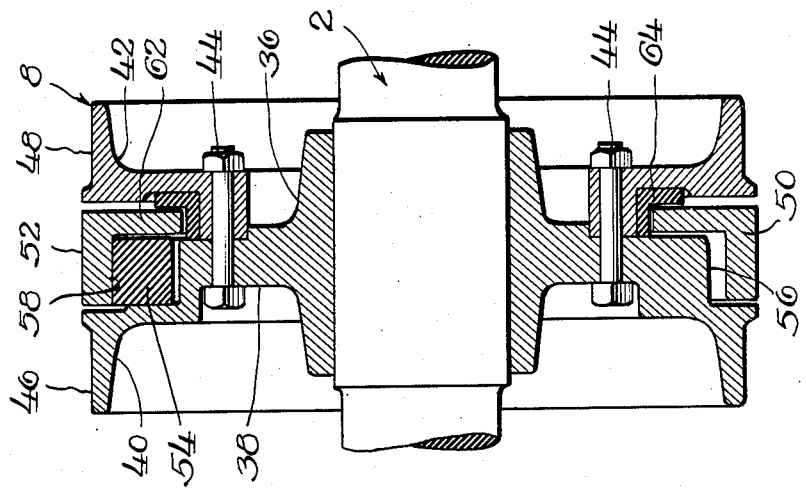
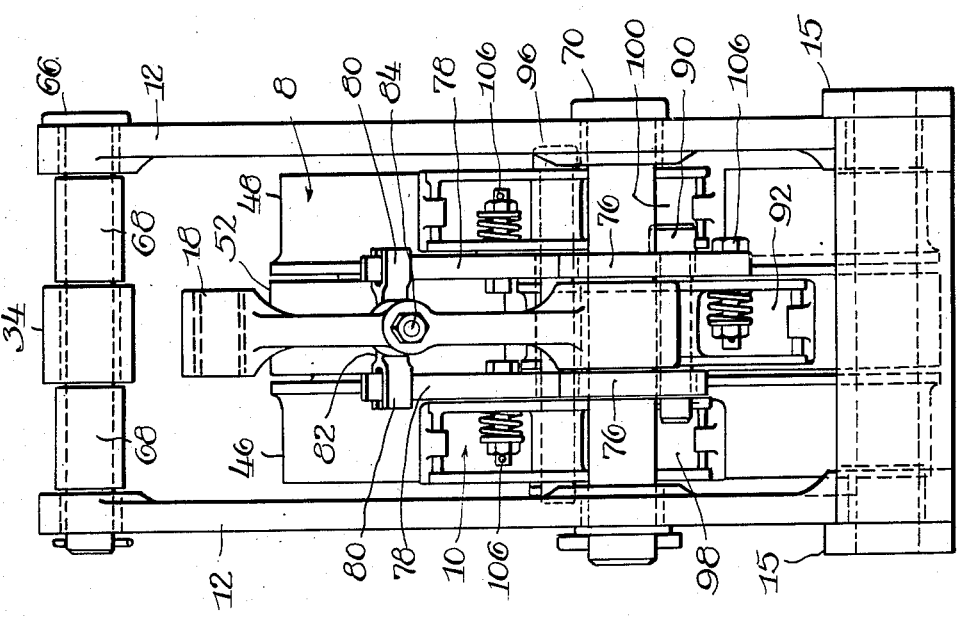
INVENTOR.
Alfred H. Oelkers
BY
Atty.

Patented May 16, 1950

2,508,336

UNITED STATES PATENT OFFICE 2,508,336

BRAKE

Alfred H. Oelkers, New Braunfels, Tex., assignor to American Steel Foundries, Chicago, Ill., a corporation of New Jersey Application May 1, 1946, Serial No. 666,361

16 Claims. (Cl. 188—58)

This invention relates to brakes and more particularly to a novel off-wheel brake for a railway car truck.

A general object of the invention is to provide braking means for a wheel and axle assembly of a railway car truck, said means being effective to decelerate rotation of said assembly without developing friction against the wheels.

Another object of the invention is to provide novel braking means such as above described accommodating a maximum effective braking force and including means for automatically reducing said force sufficiently to prevent sliding of the wheels on the rails.

Still another object of the invention is to design a novel off-wheel brake arrangement wherein means are provided for varying the effective braking force in direct proportion to the speed of rotation of the wheel and axle assembly.

It will be understood that during the braking of railway trains travelling at high speeds under conditions wherein the stop must be made in a minimum distance, the high braking force frequently causes sliding of the wheels resulting in flat spots thereon. The most efficient braking results are obtained when the braking force is sufficiently high to almost, but not quite, slide the wheels. It may be noted that inasmuch as a railway wheel is of considerable weight, it has considerable kinetic energy when revolving at high speed due to rotation about the axle, as well as kinetic energy due to movement with the car. The kinetic energy from these two sources, as well as the kinetic energy of the car body and trucks, must be absorbed by the brake in stopping the car, but at no time must the wheel stop rotating until the train stops.

Under substantially constant operating conditions wherein the rails are dry, the wheels are equally loaded, the brake shoes are substantially uniform, the air brake cylinders and pistons are equally adjusted, and the operator is skilled in braking techniques, the present conventional means of regulating braking forces by controlling the air pressure in the actuating cylinders is quite successful. However, due to many unfavorable variations in these conditions, it is desirable to provide a brake which can be set by the operating engineer to maximum stopping effort, means being provided to prevent sliding of the wheels without further manipulation of the brake and without changing the air pressure in the brake cylinders.

The foregoing and other objects and advantages of the invention will become apparent from a consideration of the following specification and the accompanying drawings, wherein:

Figure 3 is an enlarged side elevation of the novel brake device, portions of the structure being broken away for the sake of clarity;

Figure 4 is an enlarged end view of the device, taken from the left as shown in Figure 3; and Figure 5 is a sectional view through the rotor, taken in the vertical plane indicated by the line 5—5 of Figure 3.

Figure 1:
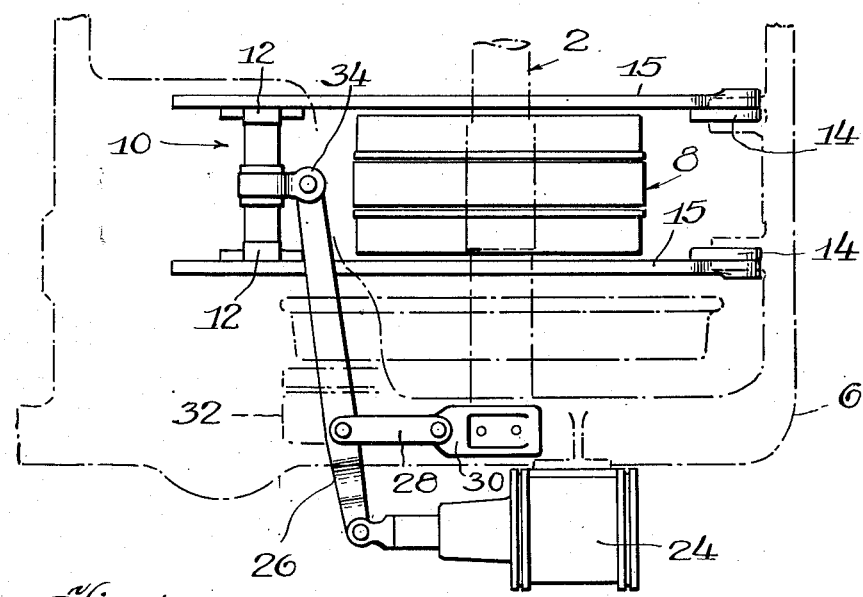
Figures 1 and 2 are general assembly views illustrating the invention as applied to a conventional railway car truck, Figure 1 being a fragmentary top plan view of the truck, and Figure 2 being a side elevation of the structure shown in Figure 1, certain details being omitted in each of said views where more clearly shown in the other thereof.
Figure 2:
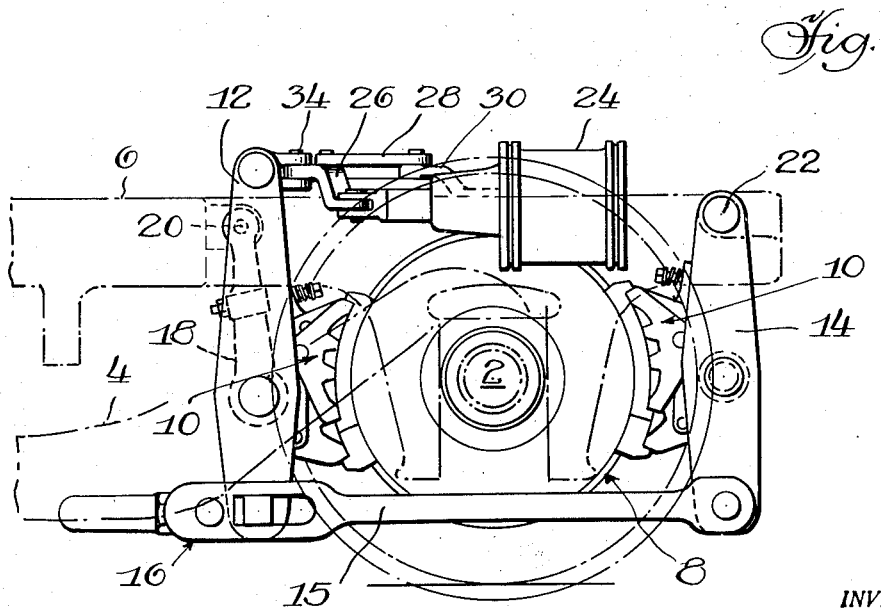

Describing the invention in detail and referring first to the general assembly views of Figures 1 and 2, the novel brake arrangement is illustrated as applied to the axle or shaft of a wheel and axle assembly 2 of a conventional railway car truck fragmentarily illustrated in these figures and comprising an equalizer 4 (Figure 2) at each side of the truck supported on conventional journal means (not shown) associated with the wheel and axle assembly 2, said equalizer affording a resilient support for the truck frame 6 by means of conventional springs (not shown).

A novel composite brake drum or rotor, generally designated 8 and hereinafter described in detail, is carried by the assembly 2; and clasp brake means, generally designated 10 and hereinafter described in detail, are associated with the rotor 8, said means comprising a pair of live truck levers 12 and a pair of dead truck levers 14 pivotally interconnected at their lower ends to inboard and outboard straps 15 equipped with conventional slack adjuster means, generally designated 16 (Figure 2). The live truck levers 12 are supported, as hereinafter described, by a hanger 18 pivotally connected at 20 to a bracket on the truck frame 6, and the dead truck levers are pivotally connected at their upper ends as at 22 (Figures 2 and 3) to brackets on said frame.

Actuating means are provided for the clasp brake means 10 in the form of a power cylinder device 24 mounted on the frame 6, the piston of said device being pivotally connected to an offset cylinder lever 26 pivotally fulcrumed intermediate its ends by a link 28 pivotally connected to a bracket 30 mounted on the frame 6. The cylinder lever 26 is preferably afforded a slidable support in conventional manner by a support bracket 32 (Figure 1) on the frame 6. The inboard end of the lever 26 is connected by a link 34 to the upper end of the live truck levers, as hereinafter described in detail.

In operation of the novel brake arrangement, upon actuation of the device 24, the piston thereof moves to the left, causing clockwise rotation of the cylinder lever 26 about its fulcrum. This causes a clockwise rotation of the live truck levers 12 about their connections to the hanger 18 and thus causes clockwise rotation of the dead truck levers 14 about their fulcrums 22, as will be readily apparent to those skilled in the art. Thus the clasp brake means 10 are operable to clasp the rotor 8, thereby decelerating rotation of the wheel and axle assembly 2.

Referring now to Figures 3-5 inclusive, the brake rotor 8 is a composite structure including a hub portion 36 press-fitted on the axle of the wheel and axle assembly 2. The hub portion 36 is integrally formed with a radially outwardly extending annular web or rib 38 (Figure 5), and an annular brake ring or drum 40 is integrally formed with the web 38. Another brake ring 42 is removably connected to the web 38 by bolt and nut assemblies 44, the rings 40 and 42 comprising axially spaced inboard and outboard peripheral friction surfaces 46 and 48 respectively.

A rotatable brake ring 50 is disposed between the rings 40 and 42 and comprises a peripheral brake surface 52 intermediate the surfaces 46 and 48, said ring 50 being supported by a plurality of friction blocks 54 rotatable with the web 38 between spaced radial ribs 56 integrally formed therewith. The blocks 54 are urged by centrifugal force in a radially outward direction and comprise friction faces on their radially outer surfaces for complementary frictional engagement as at 58 (Figure 5) with the inner cylindrical friction surface of the ring 50, said ring comprising a radially inwardly extending flange 62 engaging one side of the blocks 54 and engaging an annular L-section bearing 64 press-fitted on a portion of the ring 42. By this arrangement the ring 62 is maintained in spaced relationship with respect to the rings 40 and 42.

Referring now to Figures 3 and 4 wherein the clasp brake means 10 are illustrated in detail, it will be seen that the link 34 is connected by a pin 66 to the upper ends of the live truck levers 12, spacers 68 being disposed between the link 34 and the respective levers to maintain the link in its proper position centrally of the levers.

The live truck levers are pivotally fulcrumed by a pin 70 to the before-mentioned hanger 18, said pin affording pivotal support for a brake head and equalizer assembly comprising inboard and outboard equalizers 76 including arms 78 engageable with yokes 80 of a positioning member 82 sleeved on a bolt and nut assembly 84. The member 82 is resiliently restrained against axial movement with respect to the bolt and nut assembly 84 by springs 86 and 88 (Figure 3) compressed against opposite sides of the member 82, the spring 86 being compressed against the hanger. By means of this arrangement, the equalizers 76 are adjustably maintained in a predetermined rotational position on the pin 70 and are resiliently restrained against rotation from said position during application of the clasp brake means 10 to the rotor 8.

The equalizers 76 are pivotally connected by a pin 90 to a brake head 92 extending between the equalizers and carrying a brake shoe 94 (Figure 3) engageable with the peripheral brake surface 52 of the brake ring 50; and the equalizers are pivotally connected by a pin 96 to inboard and outboard brake heads 98 and 100 respectively carrying brake shoes 102 (Figure 3) engageable with the surfaces 46 and 48. Thus the equalizers function to direct a portion of the braking force against surfaces 46 and 48 which are fixed to the wheel and axle assembly 2 and another portion of said force against surface 52 frictionally connected to assembly 2, as above described.

Each of the brake heads is provided with balancing means in the form of a bolt and spring assembly 106 connected to the equalizer and extending through an arcuate slot 108 (Figure 3) formed in a wall of the brake head, said balancing means being effective to frictionally resist rotation of said heads about the pivot points thereof, thereby yieldingly maintaining the arcuate brake shoes 94 and 102 in proper position to engage the associated friction surfaces 46, 48 and 52 of the rotor 8, as will be clearly understood by those skilled in the art.

The dead levers 14 are pivotally connected by a pin 110 to a brake head and equalizer assembly 112, said assembly being substantially identical with that associated with the live levers, and the component parts of the assembly 112 are identified by the same numerals as the corresponding parts of the assembly heretofore described in connection with the live levers. It is noted that the spring 86 of the torque mechanism connecting the assembly 112 to the dead levers 14 is compressed against a block 114 pivoted at 116 to the dead levers, inasmuch as these levers are directly pivoted to the frame brackets rather than a hanger 18 such as that associated with the live levers 12.

While the primary object of the above-described invention is to devise an off-wheel brake device, it may be noted that if desired one of the brake rings 40 or 42 may be so disposed as to function as a wheel, thus engaging the associated rail (not shown).

In the railway brake art, the ratio of the total pounds of pressure against the peripheral braking surfaces of the wheels to the weight of the unloaded car on the rails is customarily expressed as the braking force. Thus if the unloaded car weighs 50,000 pounds at the rail and 12 shoes are applied to the four wheels with a load of 5000 pounds on each shoe, the total pressure is 60,000 pounds and the braking force is 120%. In an illustrative brake design of the above-described type, the brake shoes are so connected to the equalizers that 43.5% of the braking force is constant with a fixed cylinder pressure but the other 56.5% of the braking force varies under certain conditions directly in proportion to the square of the wheel speed without change in cylinder pressure.

One rotor 8 is preferably associated with each axle and the fixed surfaces 46 and 48 are engaged by four brake shoes 102, each under a load of 4000 pounds, or in other words, under a total load of 16,000 pounds. The surface 52 is engaged by two shoes 94, each under a load of 10,350 pounds, or in other words, under a total load of 20,700 pounds. Thus the total pounds of pressure on the various rotor surfaces by the associated friction shoes is 36,700 pounds. Inasmuch as the rotor surfaces are preferably of the order of 28 inches in diameter, whereas the wheels are conventionally of the order of 36 inches in diameter, the load of 36,700 pounds on the rotor surfaces is approximately seven ninths as effective as would be the case if this load were applied to the periphery of the wheels. In other words, a load of 36,700 pounds on a rotor 28 inches in diameter is equivalent to a load of approximately 28,000 pounds on a rotor approximately equal in diameter to that of the wheels. Thus the braking force is approximately 140% inasmuch as the load of 28,000 pounds is approximately 140% of the axle load of 20,000 pounds.

In an arrangement such as above described, it has been found that the rotating friction blocks 54 drive the center ring against the resistance of the braking force at speeds of 80 miles per hour or greater, under which conditions the 140% braking force will be maintained. As soon as the speed is reduced to below 80 miles per hour the center ring stops rotating and from this speed downward the braking effort supplied by the center ring is directly proportional to the velocity (squared) of the friction blocks which slide on the inner surface of the ring.

Under the above conditions and without change in cylinder pressure, the following graduation of the braking force is obtained:

At speed of 100 M. P. H. and over, 140% braking force
At speed of 80 M. P. H., 140% braking force
At speed of 60 M. P. H., 100% braking force
At speed of 50 M. P. H., 89% braking force
At speed of 40 M. P. H., 79% braking force
At speed of 30 M. P. H., 71% braking force
At speed of 20 M. P. H., 66% braking force
At speed of 10 M. P. H., 62% braking force At lower brake application the automatic reduction of braking force starts at lower speeds; for instance with a maintained cylinder pressure producing a braking force of 80% the following is obtained:

At speed of 100 M. P. H., 80% braking force
At speed of 80 M. P. H., 80% braking force
At speed of 60 M. P. H., 80% braking force
At speed of 50 M. P. H., 62% braking force
At speed of 40 M. P. H., 52% braking force
At speed of 30 M. P. H., 45% braking force
At speed of 20 M. P. H., 40% braking force
At speed of 10 M. P. H., 36% braking force During service brake applications of normal intensity, to reduce train speed, the center ring does not stop rotating with the wheel and the automatic reduction of braking force is not encountered.

Each brake application maintained until the train stops causes the center ring to stop rotating before the wheel stops. This does not materially affect the braking force but has the advantage of keeping the anti-wheel-slip feature in smooth operative condition.

It should be understood that the above-described brake apparatus is applicable to other vehicles such as trucks and trailers as for example by applying the rotor and brake assembly to the drive shaft which is connected in conventional manner by gears to the wheels and axles.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck comprising a truck structure and a supporting wheel and axle assembly, the combination of a rotor connected to said assembly, and clasp brake means for decelerating said rotor comprising interconnected live and dead truck levers at opposite sides of said rotor, an equalizer structure pivotally connected to each lever intermediate the ends thereof, spaced brake shoes connected to said equalizer structure on a common axis, another brake shoe intermediate said spaced shoes and pivotally connected to said equalizer structure on an axis parallel to the first-mentioned axis, friction means on said shoes engageable with friction surfaces on said rotor, and means in the connection of at least one of said surfaces to said assembly for frictionally coupling the surface therewith under a force directly proportional to the speed of rotation of said assembly.

2. In a brake arrangement for a railway car truck comprising a truck structure and a supporting wheel and axle assembly; the combination of a rotor connected to said assembly, and clasp brake means for decelerating said rotor comprising interconnected truck levers at opposite sides of said rotor, an equalizer pivotally connected to each lever, spaced brake shoes pivotally connected to the equalizer on a common axis, another brake shoe intermediate the spaced shoes and pivotally connected to the equalizer on an axis substantially parallel to the first-mentioned axis, said shoes being engageable with friction surfaces of the rotor, and means in the connection of at least one of the surfaces to said assembly for frictionally coupling the surface therewith under a force directly proportional to the rotational speed of said assembly.

3. A brake rotor comprising an annular member with an annular brake surface on the radially outer periphery thereof, another annular member secured to one side of said first-mentioned member and comprising an annular brake surface axially spaced from the first-mentioned surface, a brake ring rotatable with respect to said members and presenting an annular surface intermediate the first and second-mentioned surfaces, a plurality of friction blocks within said ring, and means for connecting said blocks to said members for rotation therewith while permitting radially outward movement of said blocks in response to centrifugal force thereon, said means comprising radial ribs on one of said members, each of said blocks being engageable at each end thereof with one of the ribs.

4. In a brake arrangement for a railway car truck comprising a truck structure and a supporting wheel and axle assembly, the combination of a rotor connected to said assembly, and clasp brake means for decelerating said rotor comprising interconnected live and dead truck levers at opposite sides of said rotor, an equalizer structure pivotally connected to each lever intermediate the ends thereof, spaced brake heads connected to said equalizer structure on a common axis, another brake head intermediate said spaced heads and pivotally connected to said equalizer on an axis parallel to the first-mentioned axis, and friction means on said heads engageable with friction surfaces on said rotor.

5. In a brake arrangement for a railway car truck comprising a truck structure and a supporting wheel and axle assembly; the combination of a rotor connected to the assembly, and clasp brake means for decelerating the rotor comprising interconnected truck levers at opposite sides of the rotor, and brake means carried by each lever, the brake means carried by at least one of the levers comprising an equalizer structure pivotally connected thereto, spaced brake shoes connected to the equalizer structure on a common axis, another brake shoe intermediate the spaced shoes and pivotally connected to the structure on an axis substantially parallel to the first-mentioned axis, and friction means on the shoes engageable with friction surfaces of the rotor, and means in the connection of at least one surface to said assembly for frictionally coupling the surface therewith under a force directly proportional to the rotational speed of the assembly.

6. In a brake arrangement for a vehicle comprising a vehicle frame and a supporting wheel and axle assembly; the combination of a rotor including a member secured to said assembly for rotation therewith, a ring carried by said member and relatively rotatable with respect thereto, a plurality of friction blocks within said ring interlocked with said member for rotation therewith and radially movable with respect thereto for frictional engagement with the inner surface of said ring in response to centrifugal force as said member rotates, and friction means carried by said vehicle for braking engagement with said ring and said member.

7. In a brake arrangement for a vehicle including a vehicle frame and a supporting wheel and axle assembly; the combination of interconnected levers disposed respectively at opposite sides of said assembly, and brake means carried by each lever for decelerating the assembly, the brake means carried by at least one lever comprising an equalizer pivoted thereto, a pair of inboard and outboard brake shoes pivotally connected to the equalizer, and an intermediate brake shoe pivotally connected to the equalizer on a pivotal axis substantially parallel to the pivotal axes of the inboard and outboard shoes.

8. A brake arrangement, according to claim 7, wherein the shoes engage spaced surfaces of the wheel and axle assembly, and at least one of the surfaces is frictionally coupled therewith under a force directly proportional to the rotational speed of the assembly.

9. In a brake arrangement for a railway car truck comprising a truck structure and a supporting wheel and axle assembly; the combination of a rotor connected to the assembly, and clasp brake means for decelerating said rotor comprising interconnected truck levers at opposite sides of the rotor, an equalizer structure pivotally connected to each lever, spaced brake heads pivotally connected to the equalizer structure, another brake head intermediate the spaced heads and pivotally connected to the equalizer structure on an axis different from and substantially parallel to the pivotal axes of said spaced heads, and friction means carried by said heads for engagement with friction surfaces of the rotor.

10. A brake rotor comprising an annular member with an annular brake surface on the radially outer periphery thereof, another annular member secured to one side of said first-mentioned member and comprising an annular brake surface axially spaced from the first-mentioned surface, a brake ring rotatable with respect to said members and presenting an annular surface intermediate the first and second-mentioned surfaces, a plurality of friction blocks within said ring, and means for connecting said blocks to said members for rotation therewith while accommodating radially outward movement of said blocks in response to centrifugal force thereon.

11. In a brake arrangement for a railway car truck comprising a truck structure and a supporting wheel and axle assembly; the combination of a rotor connected to the assembly, and clasp brake means for decelerating the rotor comprising interconnected truck levers at opposite sides thereof, brake means carried by said levers, the brake means carried by at least one lever comprising an equalizer structure pivotally connected thereto, spaced brake heads pivotally connected to the equalizer structure, another brake head pivotally connected to the equalizer structure on an axis substantially parallel to the pivotal axes of said spaced heads, and friction means on said heads engageable with friction surfaces of said rotor, said rotor being disposed entirely at one side of the longitudinal vertical center plane of the truck.

12. A brake rotor comprising a pair of substantially coaxial annular members, one of which is formed with a hub, means removably interconnecting the members to define an annular cavity therebetween, a brake ring in said cavity having a peripheral brake surface externally thereof, and means in said cavity for frictionally coupling the ring to said one member under a force directly proportional to the rotational speed of the rotor.

13. A brake rotor comprising a pair of substantially coaxial annular members, at least one of which is formed with a hub, means removably interconnecting said members to define an annular cavity therebetween, a ring member within said cavity freely removable therefrom when said members are disconnected, means in the cavity for frictionally coupling the ring member to said annular members, and peripheral brake surfaces on said members.

14. In a brake arrangement for a vehicle comprising a vehicle frame and a supporting wheel and axle assembly; the combination of a rotor including a member secured to said assembly for rotation therewith, a ring encircling a portion of said member and relatively rotatable with respect thereto, a plurality of friction blocks within said ring and interlocked with said portion for rotation therewith and radially movable with respect thereto, for frictional engagement with the inner surface of said ring in response to centrifugal force during rotation of said member, said force being the sole means for urging said blocks into engagement with said ring, and brake means carried by said vehicle for decelerating both said ring and said member.

15. A brake rotor comprising a pair of substantially coaxial annular members, at least one of which is formed with a hub for connection to an associated rotating shaft, means removably interconnecting said members to define an annular cavity therebetween, a brake ring in said cavity freely removable therefrom when said members are disconnected, said ring having a substantially radial flange extending radially inwardly into said cavity, means between the flange and one of the annular members for frictionally coupling the ring to said one member under a force directly proportional to the rotational speed of the rotor, and bearing means carried by the other member for spacing the ring therefrom, said ring and at least one of said members having peripheral brake surfaces.

16. A brake rotor comprising an annular structure including a pair of axially spaced peripheral friction surfaces, a friction ring presenting a peripheral friction surface between the first-mentioned surfaces, and means for yieldingly interconnecting said ring with said structure for rotation therewith under a force directly proportional to the rate of rotation of said rotor.

ALFRED H. OELKERS.

REFERENCES CITED

The following references are of record in the file of this patent:

UNITED STATES PATENTS

| Number | Name | Date |
|---|---|---|
| 1,531,926 | Hallot | Mar. 31, 1935 |
| 2,177,955 | Stewart | Oct. 31, 1939 |
| 2,177,957 | Stewart | Oct. 31, 1939 |
| 2,305,822 | Wittner | Dec. 22, 1942 |

FOREIGN PATENTS

| Number | Country | Date |
|---|---|---|
| 151,684 | Germany | May 24, 1903 |
| 423,235 | Great Britain | Apr. 25, 1933 |